United States Patent [19]

Burris

[11] Patent Number: 4,497,548

[45] Date of Patent: Feb. 5, 1985

[54] VARIABLE-POWER RIFLESCOPE WITH RANGE-COMPENSATING RETICLE AND A FIELD STOP DIAPHRAM CENTERED OFF THE OPTICAL AXIS

[75] Inventor: Donald J. Burris, Greeley, Colo.

[73] Assignee: Burris Company, Greeley, Colo.

[21] Appl. No.: 449,400

[22] Filed: Dec. 13, 1982

Related U.S. Application Data

[63] Continuation of Ser. No. 213,335, Dec. 5, 1980, abandoned.

[51] Int. Cl.³ .............................................. G02B 23/00
[52] U.S. Cl. .................................................... 350/560
[58] Field of Search ................. 350/560, 561, 562, 566

[56] References Cited

U.S. PATENT DOCUMENTS

| | | | |
|---|---|---|---|
| 3,386,330 | 6/1968 | Burris et al. | 350/566 |
| 3,492,733 | 4/1970 | Leatherwood | 350/560 |
| 3,782,822 | 1/1974 | Spence | 350/560 |

OTHER PUBLICATIONS

Herter's Catalogue No. 84, Aug. '73–Aug. '74, pp. 200-202.

*Primary Examiner*—Jon W. Henry
*Attorney, Agent, or Firm*—Edwin L. Spangler, Jr.

[57] ABSTRACT

This invention relates to a variable-power riflescope equipped with a novel range-compensating reticle system characterized by separating the horizontally-disposed element thereof from the vertically-disposed one, locating the former in the forward focal plane displaced off the optical axis and locating the latter in the rear focal plane while, at the same time, displacing the aiming point carried by the latter off the optical axis also. The resulting reticle system functions in cooperation with the means for varying the degree of image magnification in such a way that the shooter is enabled to precisely define two ranges, one near and one far, and shoot quite accurately at any distance therebetween. A further refined version of the same system allows the shooter to actually determine the range to a chosen target of known dimension an unknown distance away and in so doing automatically adjust the aiming point defined by the reticle system to coincide with the point of impact of the bullet. While the range is thus determinable, it is unnecessary to know since the optical system has made the required adjustment automatically that is needed to compensate for the trajectory of the bullet at such range. A field stop diaphragm is centered on the aiming point.

4 Claims, 16 Drawing Figures

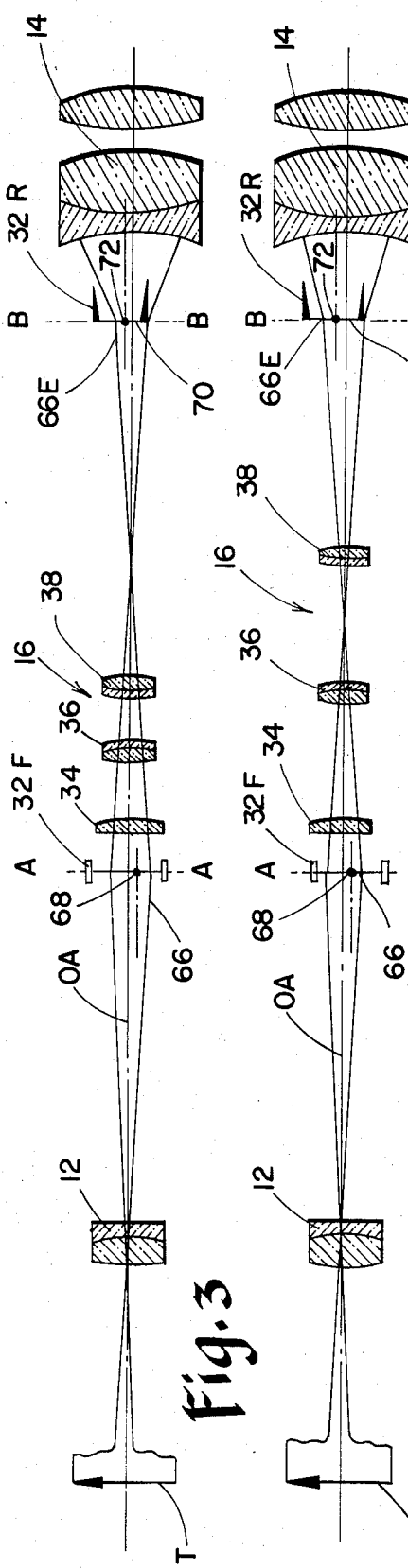
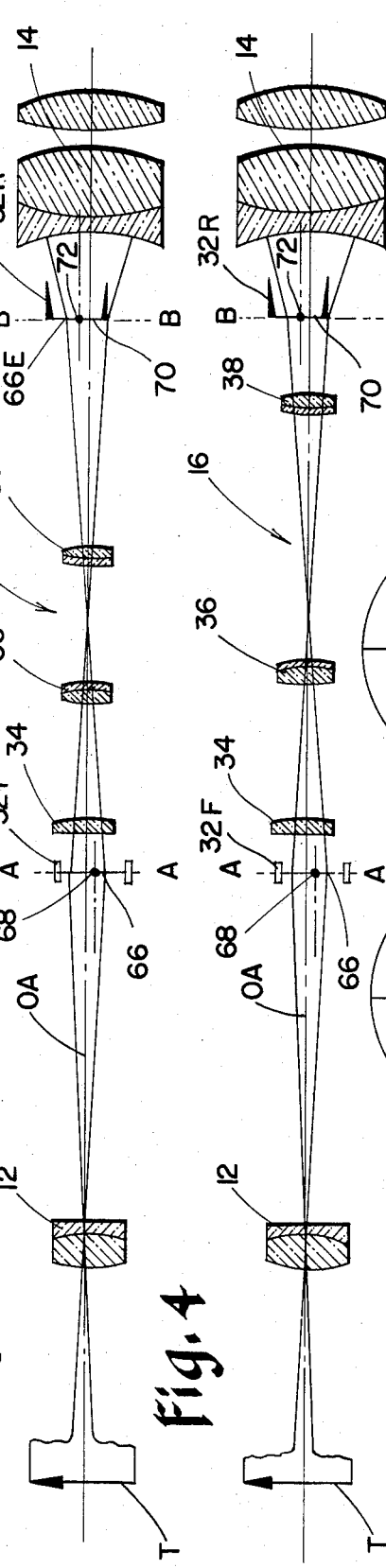
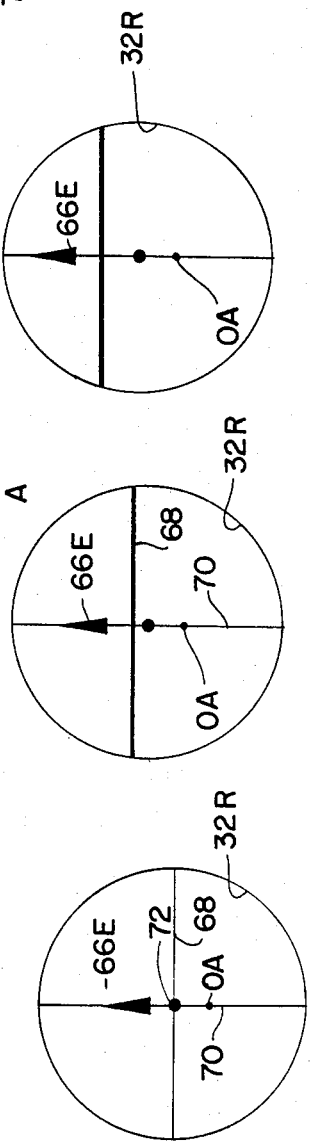
Fig. 3
Fig. 4
Fig. 5
Fig. 6
Fig. 7
Fig. 8

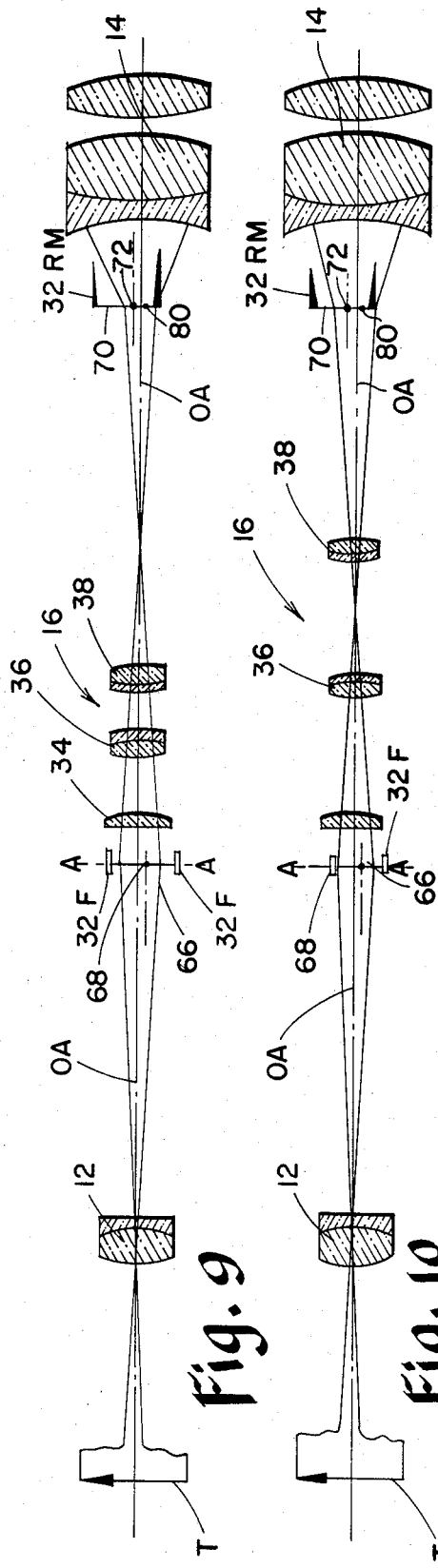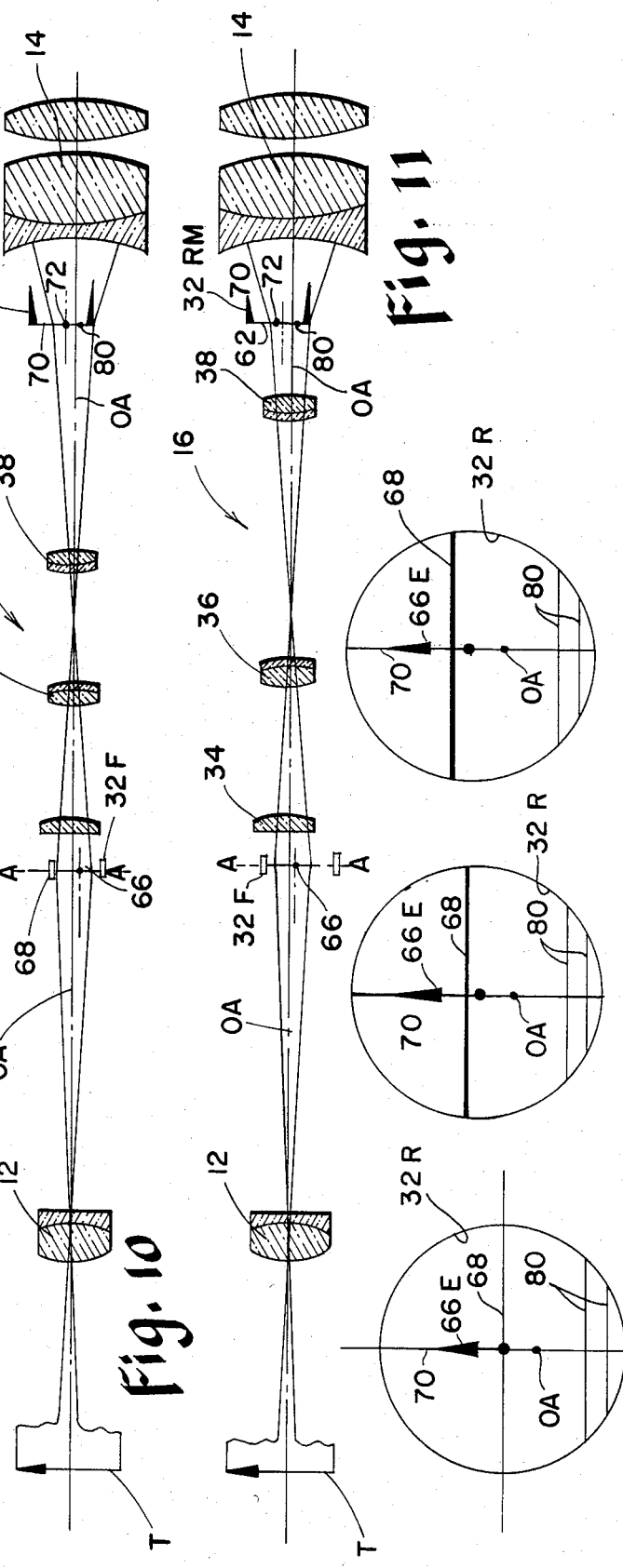

VARIABLE-POWER RIFLESCOPE WITH RANGE-COMPENSATING RETICLE AND A FIELD STOP DIAPHRAM CENTERED OFF THE OPTICAL AXIS

This is a continuation of application Ser. No. 213,335, filed Dec. 5, 1980, now abandoned.

Variable power riflescopes include an optical system that can be adapted to the determination of the distance to a chosen target. Moreover, through use of the variable power feature, the point of aim can be raised and lowered to accommodate and compensate for the trajectory of the bullet at various ranges.

U.S. Pat. No. 3,386,330 relates to an optical sighting device incorporating a range-finding feature and, in fact, one of the inventors of the foregoing apparatus is the inventor of the improved unit forming the subject matter of the instant application. The patented scope operates upon the principle of using the variable-power feature to fit a target of known dimension between a pair of vertically-spaced lines visible when looking through the optical system. Once this has been accomplished, the lowest number on a range scale that is also visible to the viewer, reads in terms of the distance to the target thus bracketed.

The foregoing patent is the closest prior art known to applicant; however, many prior art range-finding devices have been patented, among which are the following: U.S. Pat. Nos. 444,406, 2,482,822, 906,751, 2,583,042, 975,682, 2,685,814, 1,190,121, 2,806,287, 1,708,389, 2,811,894, 2,154,454, 2,867,151, 2,426,812, 2,964,991.

None of the foregoing patents including U.S. Pat. No. 3,386,330 previously noted, nor any actual riflescope known to applicant, incorporates what is believed to be the novel feature of separating the elements of the reticle that cooperate with one another to define one of two aiming references into two superimposed portions, one of which is located in the forward or first image plane and the other in the rear or second image plane. By thus separating these two elements of the reticle and, in addition, displacing the horizontally-disposed aiming indicia in the first image plane along with the other of the two aiming references in the second image plane a known preset distance off the optical axis, relative movement appears to take place therebetween when the degree of image magnification is varied. Two different versions of the riflescope are described, the simpler of the two using a bracketing system while the more complex one actually adjusts the second of the two aiming references defined by the reticle system to coincide with the point of impact through use of spaced stadia lines not unlike those of applicant's earlier patent already noted. More specifically, the range-compensating reticle system common to both versions is employed in the simpler one to preset two ranges, one close and the other far, which the shooter considers will bracket most of his or her shots. In this way, any game within this bracketed range can be handled quite satisfactorily without knowing the actual range. In the more refined version, stadia lines are used in combination with the so-called power ring that changes the degree of image magnification to bracket a known vertical dimension on the target and, once this has been accomplished, the aiming point defined by the second of the two aiming references of the reticle system will have been automatically adjusted to coincide with the point of impact.

It is, therefore, the principal object of the present invention to provide a novel and improved variable power riflescope containing a range-compensating reticle.

A second objective is the provision of a device of the type aforementioned wherein the reticle system is divided into two parts, one being located in the first focal plane and the other in the second focal plane.

Another object is to provide an optical ranging system by means of which two ranges, one near, one far, can be chosen by the shooter within which the shot is likely to be made and corresponding aiming references selected accordingly.

Still another objective is that of incorporating an actual range-finding system in such an optical sighting device by means of which the distance to the target can be determined and upon doing so, one of the aiming references defined by the reticle is automatically adjusted to substantially coincide with the point of impact at the determined range.

An additional objective is to provide a riflescope equipped with a range-compensating reticle system which can be selectively fitted with range-indicating indicia which match different ammunition thereto.

Further objects of the within described invention are to provide a variable-power riflescope equipped with ranging features that are easy to use even under field conditions, accurate, versatile, rugged, dependable and which result in no increase in size, weight or complexity when compared with prior art riflescopes having comparable capabilities.

Other objects will be in part apparent and in part pointed out specifically hereinafter in connection with the description of the drawings that follows, and in which:

FIGS. 3, 4 and 5 are diagrams showing the optical system and associated bracketed range-indicating system at low, medium and high degrees of magnification, respectively;

FIGS. 6, 7 and 8 show what the shooter sees with the optical system adjusted as in FIGS. 3, 4 and 5, respectively;

FIGS. 9, 10 and 11 are analogous to FIGS. 3, 4 and 5 while differing therefrom in the inclusion of the range-indicating stadia lines as a part of the reticle element in the second image plane;

Figure 15:
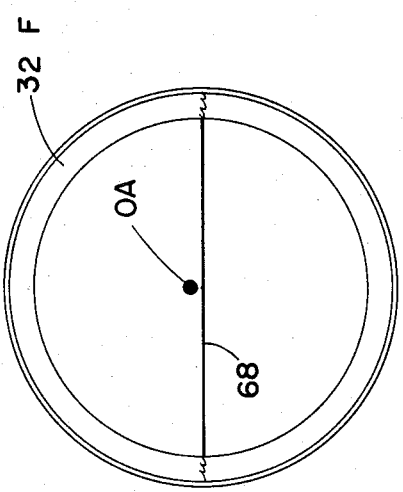
Figure 16:
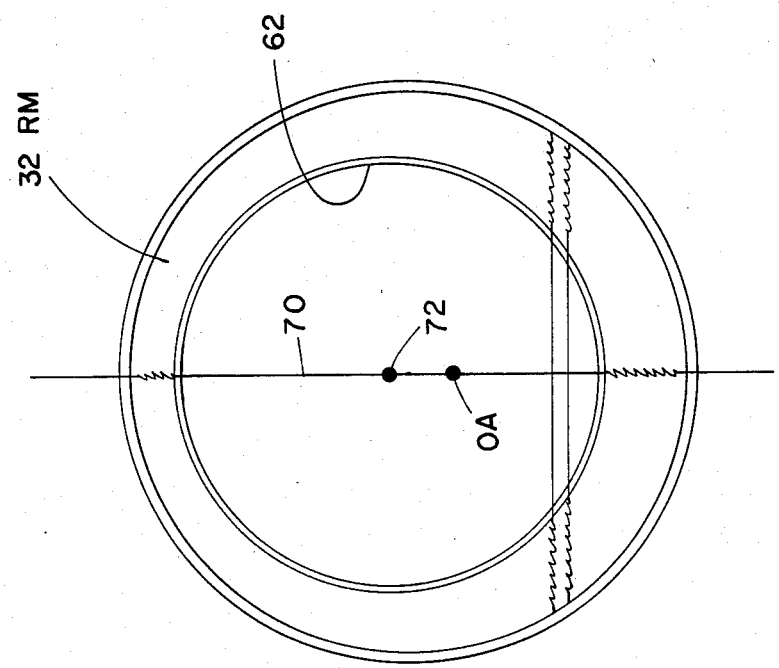

FIGS. 12, 13 and 14 are analogous to FIGS. 6, 7 and 8 in that they reveal what the shooter sees when the optical system is oriented as shown in FIGS. 9, 10 and 11, respectively;

FIG. 15 is a front elevation to an enlarged scale showing the reticle element located in the first image plane along with the offset horizontally-disposed aiming indicia carried thereby; and, FIG. 16 is a front elevation to a slightly larger scale than FIG. 15 showing the entire second focal plane reticle complete with stadia lines, the vertically-disposed aiming indicia and the second of the two aiming references also offset off the axis of the optical system.

Figure 1:
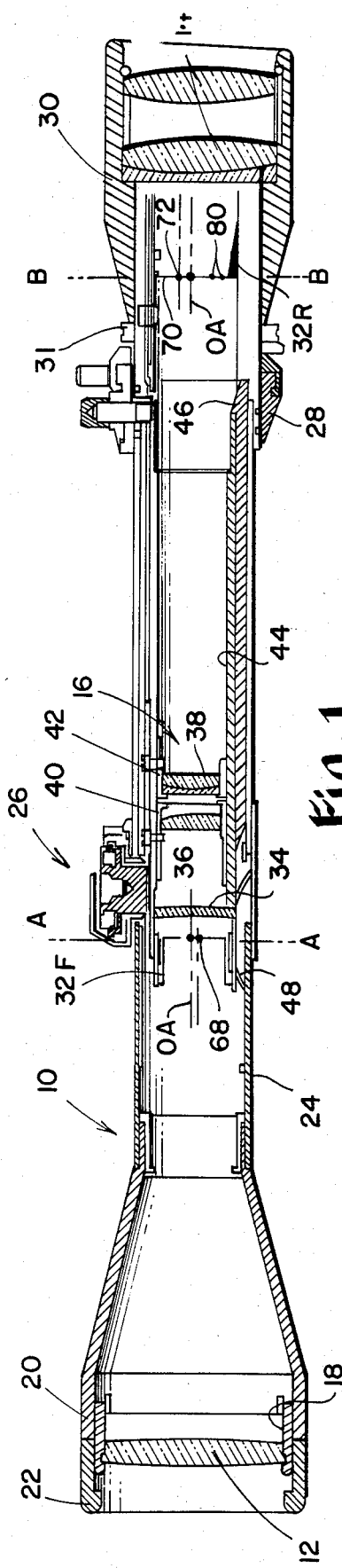
FIG. 1 is a diametrical section showing the internal construction of the improved variable-power scope incorporating the range-compensating reticle feature.
Figure 2:
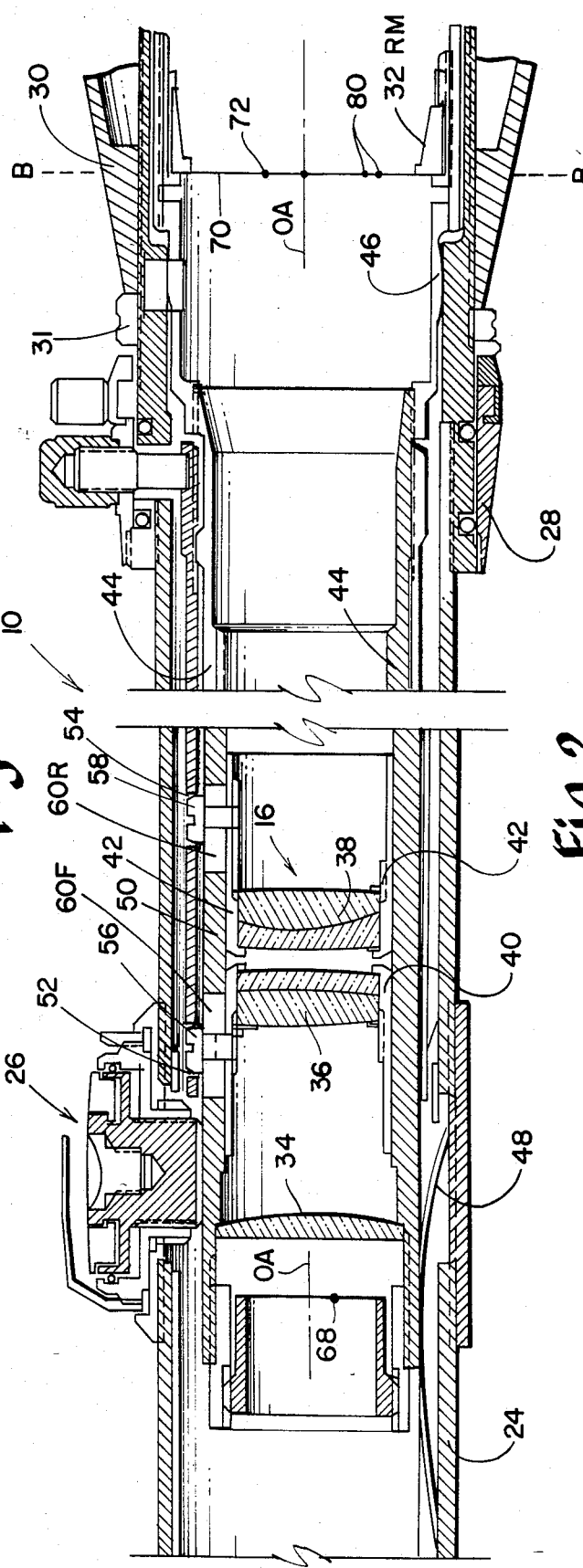
FIG. 2 is a greatly enlarged fragmentary diametrical section showing the range-compensating feature in greater detail.

Referring now to the drawings for a detailed description of the present invention and, initially, to FIGS. 1 and 2 for this purpose, it will be seen that reference numeral 10 has been used to broadly designate a variable-power riflescope of the type having an objective lens 12, an eyepiece lens system 14, and an erector lens system 16, all of which cooperate to produce a magnified image of a distant target. Objective lens 12 is mounted in lens mount 18 that is screwed or otherwise fastened into the outer extremity of flared tube 20. A collar 22 forming an extension of flared tube 20 shades the objective.

The inner end of tube 20 attaches onto the main barrel 24 which houses the erector lens system indicated in a general way by reference numeral 16, the windage and elavation correction subassemblies similarly indicated by numeral 26, the power ring 28 and associated elements used to vary the spacing between the erectors and change the degree of magnification. The eyepiece lens system 14 is housed in a flared tube 30 fastened onto the rear end of the barrel and locked in place by a lock ring 31. Adjustment of the eyepiece relative to the second or rear image plane B—B containing the rear reticle element 32R can be made to accommodate differences in the shooter's vision.

Optically, the scope is conventional in that the objective lens 12 reproduces an inverted image of a distant target T (FIGS. 3-5 and 9-11) in the first or forward image plane A—A where collector lens 34 picks it up and functions to concentrate the light rays passing onto the erectors 36 and 38 that reinvert the image. After passing through the erectors, the upright image of the target is reproduced in the second image plane B—B where the eyepiece lens system views same.

In the particular form shown, both erectors 36 and 38 are compound lenses fastened in separate mounts 40 and 42 that are, in turn, mounted for longitudinal movement in erector lens tube 44. This erector lens tube 44 is mounted within the main barrel for limited universal movement on a ring 46 such that the center of universal movement lies substantially in the second image plane. A leaf spring 48 shown rotated 45° into view biases the erector lens tube against both the windage and elevation adjustment subassemblies 26, only one of which is shown, that swing the erector lenses, collector lens 34 and the reticle elements 32F and 32R housed therein about the axis of universal movement. Such windage and elevation correction subassemblies are, likewise, common in riflescopes.

Next, as most clearly revealed in FIG. 2, to accomplish the change in degree of magnification of the target image necessary in a variable power riflescope, the image in the first image plane produced by the objective lens 12 is magnified by the erectors in varying degrees depending upon their distance from one another and from the objective. Power ring 28, which is accessible on the outside of the main barrel, is turned and operatively connected to a sleeve 50 that encircles the erector lens tube. Sleeve 50 has angularly-disposed slots 52 and 54 therein that receive pins 56 and 58 connected to the erector lens mounts 40 and 42. These pins pass through a pair of longitudinal slots 60F and 60R in the erector lens tube. It can thus be seen that as power ring 28 is turned, it will act through sleeve 50 to change the spacing between the erectors and also move them longitudinally relative to the objective. This mechanism is more fully described in U.S. Pat. No. 3,386,330 mentioned before.

As in the aforementioned patent, it is significant to the present invention that the reticle element 32R be located in the second image plane where its apparent size remains constant irresepctive of the degree of target magnification while the other element thereof, 32F, is located in the first image plane A—A where any recognizable change therein will be accompanied by a corresponding change in the size of the target image as will be explained in greater detail presently. The field stop diaphragm 62 is defined by the aperture in reticle element 32R and is also located in the second image plane where the size of said aperture is selected such that the inside surfaces of the erector lens tube and main barrel cannot be seen through the eyepiece regardless of the degree of magnification.

The essence of the present invention is most clearly revealed in FIGS. 3-14 and particularly 3-8 to which detailed reference will next be made. The target T is shown in the form of an arrow. It is reproduced upside down at 66 in the forward image plane A—A by objective 12. The inverted image 66 of a target a given distance away remains the same size in the first image plane, however, its apparent size as seen by the viewer will vary with the degree of image magnification because the erector system is located therebehind. It will also be seen that element 32F of the two-part reticle is located in this same first focal plane and it includes the horizontal crosshair 68 or whatever other indicia is selected as the horizontally-disposed feature which will function in superimposed relation with the vertical one 70 located in the rear or second image plane B—B to define the near as opposed to the distant aiming reference in a manner to be described in detail presently. Most significant in connection with the teaching of the instant invention, however, is the fact that the horizontally-disposed aiming point indicia 68 is offset underneath the optical axis represented by the dot labled OA by a known increment selected to have it intersect the vertically-disposed aiming point indicia 70 and cooperate therewith to define a first aiming reference in horizontal alignment with the point of impact at a preselected close range of, say 100 or 200 yards. Since this horizontally-disposed indicia is located ahead of the erectors in the forward image plane A—A, its size as seen by the viewer changes along with that of the target as the degree of image magnification is varied as indicated in FIGS. 6-8 and 12-14. Since the horizontally-disposed aiming indicia 68 is very thin and the field stop diaphrapm prevents the viewer from seeing the ends thereof, there is relatively little apparent change in the size thereof discernable to the viewer. Because the target image and the horizontally-disposed reticle indicia are responding in like manner to the change in the degree of image magnification, their positions relative to one another remain unchanged in the eyes of the viewer. By offsetting this horizontally-disposed reticle indicia a predetermined fixed distance below the optical axis, applicant takes advantage of this unchanging relationship to enable the user to zero his rifle at a known close range which remains essentially fixed in comparison with a second distant range which can be varied in a manner soon to be described.

Now, FIGS. 3, 4 and 5 along with companion FIGS. 9, 10 and 11 are intended to show the same target T at successively greater distances from the shooter say, for instance, 200 yards (FIGS. 3 and 9), 350 yards (FIGS. 4 and 10) and 500 yards (FIGS. 5 and 11). Due to space limitations, no attempt has been made to show that the size of the inverted image 66 in the first image plane A—A will grow successively smaller due to the greater distance of the shooter from the target, it being the largest in FIGS. 3 and 9, the smallest in FIGS. 5 and 11 and of intermediate size in FIGS. 4 and 10. By the same token, the erect image 66E of the target T as seen by the shooter will be much the same size as shown in FIGS. 6–8 and 12–14 because each represents a greater degree of image magnification of a more distant target. Specifically, FIGS. 6 and 12 show the 200 yard target at the lowest degree of magnification, FIGS. 7 and 13 the 350 yard target at an intermediate degree of image magnification and FIGS. 8 and 14 the 500 yard target at the highest degree of image magnification.

Next, in the diagrams of FIGS. 6–8 and 12–14, it can be seen that the position of the horizontally-disposed aiming indicia 68 appears to rise in the field of view as the degree of image magnification is increased, FIGS. 6 and 12 representing the minimum degree of image magnification, FIGS. 8 and 14 the maximum and FIGS. 7 and 13 some intermediate degree. This apparent shift takes place because horizontal indicia 68 is offset beneath the optical axis OA which upon being inverted by the erector system places it above the optical axis as seen in the second image plane. Vertically-disposed aiming indicia 70 along with the aiming reference 72 carried by the latter are already in the second image plane with the dot displaced above the optical axis OA by the precise amount required to position it on the horizontally-disposed indicia 68 at the lowest degree of image magnification as seen in FIGS. 6 and 12. Note, however, that as the degree of image magnification is increased above the minimum (FIGS. 7, 8, 13 and 14), the horizontally-disposed aiming indicia appears to the viewer to rise in the field of view as defined by the field stop 62 and also rise above dot 72. What is really happening is that dot 72 remains fixed in the center of the field of view and the distance that the horizontally-disposed aiming indicia 68 is offset beneath the optical axis becomes magnified up to a factor of 3 or 4 times depending upon the power range of the particular optical system. If, for example, the target was a bullseye located 200 yards away and the aiming point defined by the intersection of the horizontally and vertically-disposed aiming point indicia 68 and 70, respectively, was zeroed at this same range, then at the minimum power setting, both the close range aiming reference defined by the crossed indicia and the long-range aiming reference defined by dot 72 would be on the center of the target. If, then, the power ring eas actuated to raise the degree of image magnification of the 200 yard target, the close-range aiming reference defined by the intersection of indicia 68 and 70 would remain centered in the bullseye while the long-range aiming reference defined by dot 72 would appear to the viewer to drop down below the bullseye. All this time the target would be getting larger and larger although its relationship to the close-range aiming reference defined by the crossed indicia 68 and 70 would remain unchanged.

From a hunter's standpoint, the true state of affairs is that repesented in FIGS. 3–14 where the target T does not remain at the fixed minimum distance at which close range the aiming reference defined by the crossed indicia is zeroed, but instead, the target gets farther and farther away. In such a situation, the apparent size of the target T can be made to appear unchanged or nearly so by increasing the degree of image magnification. As this takes place, however, the close-range aiming reference defined by the intersection of the crossed indicia can be held at the same place on the target but, if this is done, the long-range aiming reference 72 will appear to drop lower and lower down thereon. Obviously, if the close-range aiming reference defined by the intersection of the crossed indicia was zeroed to coincide with the point of impact at 200 yards, it would not do so at, say, 350 or 500 yards since the trajectory of the bullet at these greater ranges would be such that it would impact the target several inches low. Equally obvious is the fact that if the long-range aiming reference defined by the dot 72 were raised up so as to coincide with the point on the target that the shooter wishes to hit, the point of impact of the bullet will probably more nearly coincide with the aiming point defined by the dot because in raising the latter, the axis of the gun barrel is also elevated which compensates for the drop in the bullet at the greater range.

Now, this phenomena can be employed to advantage to provide the shooter with a second known range in addition to the close range at which the aiming reference defined by the intersecting crosshairs or other crossed indicia were zeroed. Assume, for instance, that the shooter was going after deer and that the maximum shot in the particular country he or she were going to be hunting would be, say, 350 yards. Having made this choice, the long-range aiming reference defined by dot 72 would be zeroed at the chosen maximum or distant range. At the preselected close range (200 yards) the aiming reference defined by the intersection of the horizontally and vertically-disposed indicia 68 and 70 will coincide with the point of impact assuming no windage correction is required. If the crosshair is zeroed at 200 yards and the target is closer, the error is negligible for field shooting purposes because, at most, the point of impact will be an inch or two high. If, perchance, the target is at or reasonably close to the maximum range selected, then the long-range aiming reference 72 should coincide with the point of impact. Obviously, this will rarely be the situation; however, with the crosshair 68 and dot 72 bracketing the ranges between 200 and 350 yards, it becomes a simple matter for the hunter to estimate an aiming reference somewhere between the two selected ones thus defined and, by so doing, the shot will be made with a great deal more accuracy than can ordinarily be achieved by "holding over" on distant targets. Since presumably shots at these ranges are being made with a large caliber rifle to bring down large game animals like deer and elk, hitting an inch or two above or below a point of aim selected well within the vertical confines of the animal's body will result in a fatal hit. An experienced big game hunter knowing the type of terrain he or she is going to hunt can rather easily select a distant range beyond which it is most unlikely that a shot will be taken.

To facilitate setting of the more distant range of the two without having to actually zero in the rifle at the chosen distance, it is possible to label the power ring 28 with a range scale (not shown) matched to the most common hunting loads and calibers. In this way, the hunter can adjust the dot 72 to coincide with the point of impact at any range between, say 200 and 500 yards in the field and without having to zero in at the chosen distance provided he or she is using ammunition matched to the scale on power ring 28. Of course, if other than standard loads are used, then the shooter must make up his or her own scale matched to the ammunition by zeroing the long-range aiming reference 72 in at various ranges beyond the chosen minimum range.

Looking next at FIGS. 9 through 14 of the drawings, the long-range aiming reference 72 along with the close-range aiming reference defined by the intersection of the horizontally and vertically-disposed aiming point indicia 68 and 70 remain precisely as previously described, however, in addition, the modified reticle element 32RM in the second image plane B—B is provided with a pair of vertically-spaced and horizontally-disposed stadia lines 80 that add the range-finding dimension to the previously described riflescope. The use of stadia lines in conjunction with the power ring 28 and associated scale of a variable-power riflescope to determine the range to a distant target is an old and well established technique which is fully set forth in the previously noted U.S. Pat. No. 3,386,330. Briefly, the stadia wires were spaced apart so as to bracket a vertical dimension of, perhaps, 18 inches on a distant target. If the shooter were able to define such a dimension on the target like, for instance, the distance from the shoulder to the brisket on a full grown deer, he or she had only to adjust the power ring 28 until this portion of the target exactly fit between the stadia lines whereupon a range scale located within the field of view would indicate the distance to the target.

In the improved version of the riflescope revealed in FIGS. 9 through 14, the stadia lines 80 perform their selfsame functions, however, instead of the range to the target appearing on the range scale viewed in the field of view, the long-range aiming reference defined by dot 72 has automatically shifted to a position where it lies in substantial horizontal alignment with the point of impact at the distance thus determined. In other words, no further adjustment, calculation or even reading of a range scale is required, only holding the long-range aiming reference on the vital area of the target.

Briefly referring to FIGS. 15 and 16, in FIG. 15 it can be seen that the horizontally-disposed aiming indicia 68 is, in fact, displaced beneath the optical axis OA by a small amount, the aforementioned axis passing through the center of front reticle element 32F. In actual practice with most field loads for large caliber rifles, offsetting the horizontal crosshair only a matter of between one and two hundredths of an inch or so will place the aiming reference defined by the intersection between it and the vertical crosshair 70 coincident with the point of impact assuming no windage correction. Since element 32F does not define the field stop, the opening therein is concentric with respect to the optical axis OA.

Looking next at FIG. 16, however, it will be seen that the field stop aperture 62 in the reticle element 32RM as well as 32R is eccentric rather than concentric. Specifically, its center is raised above the optical axis OA by an increment predetermined to place the long-range aiming reference defined by dot 72 into coincident relation with the intersection of the horizontally and vertically-disposed aiming indicia 68 and 70 at the minimum magnification setting. For a 3×–9× power riflescope, this eccentricity has been calculated to be in the order of just under three hundredths of an inch.

In closing, it should be pointed out that while the front and rear reticle elements 32F and 32R, respectively, have been both illustrated and described in terms of one carrying a horizontally-disposed aiming point indicia and the other a vertically-disposed one which appear to the viewer to intersect and define one of the two aiming references, other commonly used aiming indicia can be substituted for one or the other or both and still provide the user with the selfsame end result. For instance, a single dot could replace the horizontal crosshair 68 in the first focal plane and a horizontal crosshair dot 72 in the second focal plane and the two would still cooperate with vertical crosshair 70 to produce two aiming references, one close and one distant.

What is claimed is:

1. In a variable-power riflescope having an optical axis defined by an optical system including objective lens means at the front end thereof adapted to reproduce an inverted image of a distant real object in a first image plane spaced rearwardly thereof, erector lens means mounted for axial movement to the rear of the first image plane adapted to reproduce an erect image of the real object in a second image plane spaced therebehind at varying degrees of magnification, eyepiece lens means located behind the second image plane adapted to focus upon the erect image reproduced therein, and means connected to the erector lens means operative upon actuation to shift the axial positions thereof so as to vary the degree of image magnification, the improvement which comprises: first reticle means mounted in the first image plane carrying first aiming indicia visible through the eyepiece lens means, second reticle means mounted in the second image plane carrying second aiming indicia visible through the eyepiece lens means in superimposed relation upon the first aiming indicia, said first and second aiming indicia cooperating when thus superimposed to define a first aiming reference in substantial horizontal alignment with a point of bullet impact at a first preselected range, point-definiing means defining a point located in the second image plane displaced vertically with respect to the optical axis, said point-defining means being responsive to increases in the degree of image magnification so as to open a gap between it and the first aiming reference, and said point-defining means when so moved defining a second aiming reference in vertically-spaced relation to said first aiming reference and in substantial horizontal alignment with a point of bullet impact at a different range, and means in said second image plane defining a field stop diaphragm with said point-defining means at the center thereof.

2. An improvement in a variable-power riflescope having an optical axis defined by an optical system including objective lens means at the front end thereof adapted to reproduce an inverted image of a distant real object in a first image plane spaced rearwardly thereof, erector lens means mounted for axial movement to the rear of the first image plane adapted to reproduce an erect image of the real object in a second image plane spaced therebehind at varying degrees of magnification, eyepiece lens means located behind the second image plane adapted to focus upon the erect image reproduced therein, and means connected to the erector lens means operative upon actuation to shift the axial positions thereof so as to vary the degree of image magnification, the improvement comprising: first reticle means mounted in the first image plane carrying a horizontal component of a first aiming indicia visible through the eyepiece lens means, second reticle means mounted in the second image plane carrying a vertical component of said first aiming indicia and a second aiming indicia coincident with said vertical component, said vertical component being visible through the eyepiece lens means in superimposed intersecting relation upon said horizontal component of the first aiming indicia, said intersection defining a first aiming reference displaced beneath the optical axis a first predetermined distance, said second reticle means being eccentrically-apertured to define a field stop diaphragm encircling said first aiming reference in concentric relation thereto, said second aiming indicia defining a point located in the second image plane on said vertical component, said point being displaced above the optical axis a second predetermined distance, said first predetermined distance being selected to permit horizontal alignment of said first aiming reference with a location of bullet impact at a preselected close range, said first displacement being magnified by increases in the degree of image magnification to open a viewed vertical gap between said point and said first aiming reference, said second preselected distance being selected to permit said point to be placed in substantial horizontal alignment with a location of bullet impact at a long range at a selected magnification of the viewed image, said first and second aiming indicia bracketing a series of ranges between said close and long range whereby a shooter can estimate a point of bullet impact and a corresponding aiming reference anywhere therebetween so long as said selected degree of image magnification is maintained.

3. The improved variable-power riflescope as set forth in claim 2 wherein the point is displaced above the optical axis a predetermined distance selected to place same in superimposed relation upon the first aiming reference at the minimum degree of image magnification.

4. The improved variable-power riflescope as set forth in claim 2 wherein the eccentrically located field stop diaphragm is located in the second image plane.

* * * * *